(12) United States Patent
Bharadwaj et al.

(10) Patent No.: US 8,443,078 B2
(45) Date of Patent: May 14, 2013

(54) METHOD OF DETERMINING EQUIVALENT SUBSETS OF AGENTS TO GATHER INFORMATION FOR A FABRIC

(75) Inventors: Sunil Bharadwaj, Portland, OR (US); Stephen A. Byrd, Sunnyvale, CA (US); David L. Merbach, Rochester, MN (US); Sumant Padbidri, San Jose, CA (US); William Tuminaro, San Jose, CA (US); Kevin J. Webster, Lake Worth, FL (US); Li Zhou, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 12/860,374

(22) Filed: Aug. 20, 2010

(65) Prior Publication Data

US 2012/0047249 A1    Feb. 23, 2012

(51) Int. Cl.
*G06F 15/173* (2006.01)
(52) U.S. Cl.
USPC ........... 709/224; 709/223; 709/225; 709/226; 370/254
(58) Field of Classification Search .......... 709/223–226; 370/254
See application file for complete search history.

(56) References Cited

U.S. PATENT DOCUMENTS

| | | | | |
|---|---|---|---|---|
| 5,161,116 A * | 11/1992 | Schneider et al. | ............ | 702/186 |
| 7,308,499 B2 * | 12/2007 | Chavez | ........................ | 709/226 |
| 7,424,533 B1 * | 9/2008 | Di Benedetto et al. | ........ | 709/226 |
| 7,697,525 B2 * | 4/2010 | Zelig et al. | ..................... | 370/390 |
| 2005/0083854 A1 * | 4/2005 | Nagarajrao et al. | .......... | 370/254 |
| 2006/0235985 A1 * | 10/2006 | Ramkumar et al. | .......... | 709/229 |
| 2012/0047249 A1 * | 2/2012 | Bharadwaj et al. | ........... | 709/224 |

OTHER PUBLICATIONS

Scott-et al.; "A Study of the Impact of Direct Access I/O on Relational Database Management Systems"; ACM Digital Library; pp. 1-10; 2000-2001.
Paremus-; "The Paremus Service Fabric—A Technical Overview—White Paper"; Google; Sep. 2009.
Brocade—"Solution Guide: Migrating from Brocade Fabric Manager to Brocade Data Center Fabric Manager"; Google; 2008.
Smith-et al.; "Under the Hood: Inside The Cloud Computing Hosting Environment"; 2009.

* cited by examiner

*Primary Examiner* — Backhean Tiv
(74) *Attorney, Agent, or Firm* — Kunzler Law Group, PC

(57) ABSTRACT

Techniques for identifying and selecting equivalent sets of agents with defined capabilities to perform certain actions are disclosed herein. In one embodiment, determining agents to gather information for a storage area network fabric may be performed through the use of fabric discovery operations which identify agents capable of performing various actions within the fabric. From the determined capabilities of the agents, a dynamic capability grid may be populated to assist with the generation of a list of equivalent subsets to perform the various actions. The most efficient set of agents from each equivalent subset may then be selected to perform actions, with other sets of agents in the equivalent subset available as secondary choices in case of an unexpected failure. For example, a fabric probe may be executed in a storage area network using discovered agents from a list of equivalent subsets to most efficiently accomplish network operations such as zoning and topology.

20 Claims, 6 Drawing Sheets

| AGENT | FABRIC | SWITCH | TOPOLOGY | BLADE | SWITCH PORT INFORMATION FOR PERFORMANCE MANAGEMENT | PHYSICAL INFRASTRUCTURE |
|---|---|---|---|---|---|---|
| C1 | 1 | SW1 | 1 | 1 | 1 | 0 |
| O1 | 1 | SW1 | 1 | 0 | 0 | 0 |
| SRA1 | 1 | SW1 | 1 | 0 | 0 | 0 |
| | | | C1,O1, SRA1 | C1 | C1 | |
| | | | | | | |
| | | | | | | |
| C1 | 1 | SW2 | 1 | 1 | 1 | 0 |
| O2 | 1 | SW2 | 1 | 0 | 0 | 0 |
| SRA1 | 1 | SW2 | 1 | 0 | 0 | 0 |
| | | | C1,O2, SRA1 | C1 | C1 | |

| AGENT | FABRIC | SWITCH | TOPOLOGY | BLADE | SWITCH PORT INFORMATION FOR PERFORMANCE MANAGEMENT | PHYSICAL INFRASTRUCTURE |
|---|---|---|---|---|---|---|
| C1 | 1 | SW1 | 1 | 1 | 1 | 0 |
| O1 | 1 | SW1 | 1 | 0 | 0 | 0 |
| SRA1 | 1 | SW1 | 1 | 0 | 0 | 0 |
|  |  |  | C1,O1, SRA1 | C1 | C1 |  |
| C1 | 1 | SW2 | 1 | 1 | 1 | 0 |
| O2 | 1 | SW2 | 1 | 0 | 0 | 0 |
| SRA1 | 1 | SW2 | 1 | 0 | 0 | 0 |
|  |  |  | C1,O2, SRA1 | C1 | C1 |  |

Fig. 5

METHOD OF DETERMINING EQUIVALENT SUBSETS OF AGENTS TO GATHER INFORMATION FOR A FABRIC

FIELD OF THE INVENTION

The present invention generally relates to data communications and operations occurring within storage area networks and other defined systems. One embodiment of the present invention more specifically relates to the management of storage area network operations through the use of agents.

BACKGROUND OF THE INVENTION

Fibre channel (FC) storage area networks (SANs) may be configured to provide a network topology having a plurality of "fabrics." Fabrics are typically comprised of one or more fibre channel switches that allow endpoint devices ("nodes") connected to each other to communicate via the switched network. A typical management application for a FC storage area network uses a variety of data sources (commonly referred to as "agents") that can probe and report on the status of a fabric and the fabric's members. These agents will use varying application programming interfaces (APIs) for communication and have a range of (and possibly overlapping) capabilities both in terms of the switches "visible" to the agent and the type of information provided on these entities. The capabilities of agents and the list of switches visible to an agent also may change over time.

Typically, a set of multiple agents may be required to collect information for each fabric each time that data needs to be collected, because agents can have different capabilities and may be able to report on different subsets of switches in the fabric. Due to overlap and redundancy between agents, using all the agents capable of reporting on some aspect of one or more switches in the fabric is inefficient. This inefficiency is caused by the traffic load created on the fabric and the redundant data collection and subsequent processing overhead.

A more efficient solution is to find a subset of agents that can provide maximal coverage of information (both in terms of switches in the fabric and the capabilities/categories of information that is reported) and then use that set to reduce the management traffic load and subsequent processing. Although some existing techniques are capable of discovering network information from multiple information gathering agents, existing techniques fail to efficiently find a minimal solution for the number of agents required and have shortcomings in responding to failures. What is needed are improved techniques of determining and ranking subsets of agents, as well as improved techniques to use these subsets for gathering information about nodes within a fabric.

BRIEF SUMMARY OF THE INVENTION

Various aspects of the present invention provide techniques to determine equivalent (or equivalent with some limitations) subsets of agents that may be used to most effectively gather information for a storage area network fabric or other defined environment. The techniques disclosed herein further provide solutions for maximizing information gathered for fabrics given a mix of agents; provide the ability to determine limitations in information collected for fabrics; and also provide the ability to perform "what if" analysis to analyze the impact of agents being added and removed while also determining agents to be added to overcome limitations in information collected.

In one embodiment, an algorithm is used to compute the equivalent subsets and then perform an agent assignment. The agent assignment utilizes agents from one or more highest ranked equivalent subsets of agents to gather information for a fabric. Such an assignment potentially uses fewer agents to collect information for a fabric while still maximizing information collected. The assigned agents may then operate to gather information from the fabric, and any agents that fail to properly run or function may be replaced by other equivalent subsets of suitable agents.

A further aspect of the present invention extends the concept of "equivalent subsets" to provide enhanced functionality of the availability of information for a fabric. For example, it is possible to perform a number of "what if" scenarios to analyze the impact of an agent or agent type being added or removed. It is also possible to determine what type of agent or specific agent/agents need to be added so that complete information can be collected for a fabric, while also determining which subset of agents is likely to be successful in gathering the information. Moreover, the use of equivalent subsets makes it possible to try additional equivalent subsets if several subsets fail while gathering information, thereby increasing the likelihood of collection of information for a fabric.

Some of the advantages of the presently disclosed techniques over those known in the prior art include the following: 1) A maximization of information collected using minimal number of agents, and the ability to use agents to collect partial information in cases where some of the information is not needed or is being collected by other agents; 2) A determination of whether the complete information can be collected for the fabrics based on a mix of agents and also determining the specific information that will not be collected in case only partial information can be collected; 3) The ability to handle failure scenarios that include determining specific alternate agents to be used to gather information, preventing false alerts being generated when failures occur and ability to perform pre-checks to improve likelihood of success on first run; and 4) The ability to support "what if" analysis of the effect of adding/removing agents/agent types and what agents/agent types need to be added to improve the coverage of information, using alternate algorithms to invoke equivalent agent subsets in parallel to reduce overall processing time while improving robustness at the same time.

In one specific embodiment disclosed herein, a method for determining agents to gather information from fabrics in a storage area network includes performing fabric discovery operations on the set of fabrics using agents connected to the storage area network, generating groups of equivalent subsets of agents that can collect information for the fabrics using capability information identified from the fabric discovery operations, selecting equivalent subsets of agents for each fabric to be probed, and ultimately executing fabric probes on the set of fabrics using the selected equivalent subsets.

More specifically, when generating groups of equivalent subsets of agents from the fabric discovery operations, the equivalent subsets of agents may be grouped based on agent capabilities relative to each fabric in the storage area network. For example, these capabilities may include topology, blade, switch port information for performance management, and physical infrastructure. The following steps may then be repeated for each fabric: populating a capability matrix with data for each agent reporting on the fabric, the capability matrix providing an indication of a set of capabilities of each agent for the fabric; identifying subsets of agents having overlapping capabilities for the fabric as indicated in the capability matrix; performing a communication check on each agent in each subset of identified agents; and adding each subset of identified agents to a group within the groups of equivalent subsets responsive to successful performance of the communication check for the subset of identified agents. These equivalent subsets that are produced are combinations of the subsets that maximally cover all categories of information for all the switches in the fabric.

Another specific embodiment for selecting equivalent sets of agents with defined capabilities using a dynamic capability grid is also described herein, allowing the selection and use of equivalent subsets from more generic environments. In this embodiment, similar steps are performed, including performing discovery operations using each agent capable of collecting information within a defined environment; generating a groups of equivalent subsets of agents from the discovery operations; selecting equivalent subsets from the groups of equivalent subsets to perform actions based on agent capabilities and characteristics associated with the equivalent subsets; and executing operations within the defined environment using the selected equivalent subsets.

The equivalent subsets of agents grouped based on types of agent capabilities discovered in the defined environment, including populating a capability matrix with data for each agent operating within the defined environment, the capability matrix providing an indication of a set of capabilities for each agent relative to items within the defined environment; identifying sets of agents having overlapping capabilities within the defined environment as indicated in the capability matrix; scoring and ranking the set of identified agents; and adding each set of identified agents to a group within the groups of equivalent subsets.

Another embodiment of the present invention provides for a storage management system comprising a processor, a memory unit, and instructions stored within the memory unit for gathering information from a set of fabrics in a storage area network (or from a more generally defined environment) consistent with the techniques described herein. Additionally, another embodiment of the present invention provides for a computer program product for gathering information from a set of fabrics in a storage area network (or from a more generally defined environment), with the computer program product comprising a computer readable storage medium having computer readable program code embodied therewith to implement the techniques described herein.

BRIEF DESCRIPTION OF THE DRAWINGS

FIG. 5 illustrates an example dynamic capability grid storing values for a set of switches and agents within a fabric in accordance with one embodiment of the present invention.

DETAILED DESCRIPTION OF THE INVENTION

The presently disclosed invention provides various techniques and configurations to facilitate the efficient identification and use of agents to gather information from a storage area network fabric or other complex item configuration. For example, in existing SAN fabric management scenarios, multiple agents gather redundant information about fabrics. One embodiment of the presently disclosed invention operates to reduce the management load and reduce the amount of required processing by using a subset of agents and making assignments of fabrics for which each of those agents should probe.

The following disclosure provides a set of non-limiting examples related to storage area networks and various fabric management techniques within such networks. As those skilled in the art would recognize, embodiments of the present invention may be used in any environment in which there are agents (or similar data-collecting sources) that can report or collect information about a complex configuration (such as a fabric).

In a SAN, an agent serves as a data source that can report on some information about a fabric. Given a mix of agents that can probe a SAN fabric, one embodiment of the present invention may operate to determine the limitations (if any) of the information that can be collected during a fabric probe. Further, various embodiments of the present invention may operate to determine equivalent agents and equivalent subsets of agents which can collect information from the fabric if one or more of the agents fails to operate properly. Once equivalent agent subsets are competed for a fabric, then a number of what-if scenarios may be run, including determining the effect of removing an agent; invoking agents from multiple subsets in an equivalent subset; and calculating other ways to improve robustness of fabric probes while also reducing the number of agents used in the probe.

Figure 1:
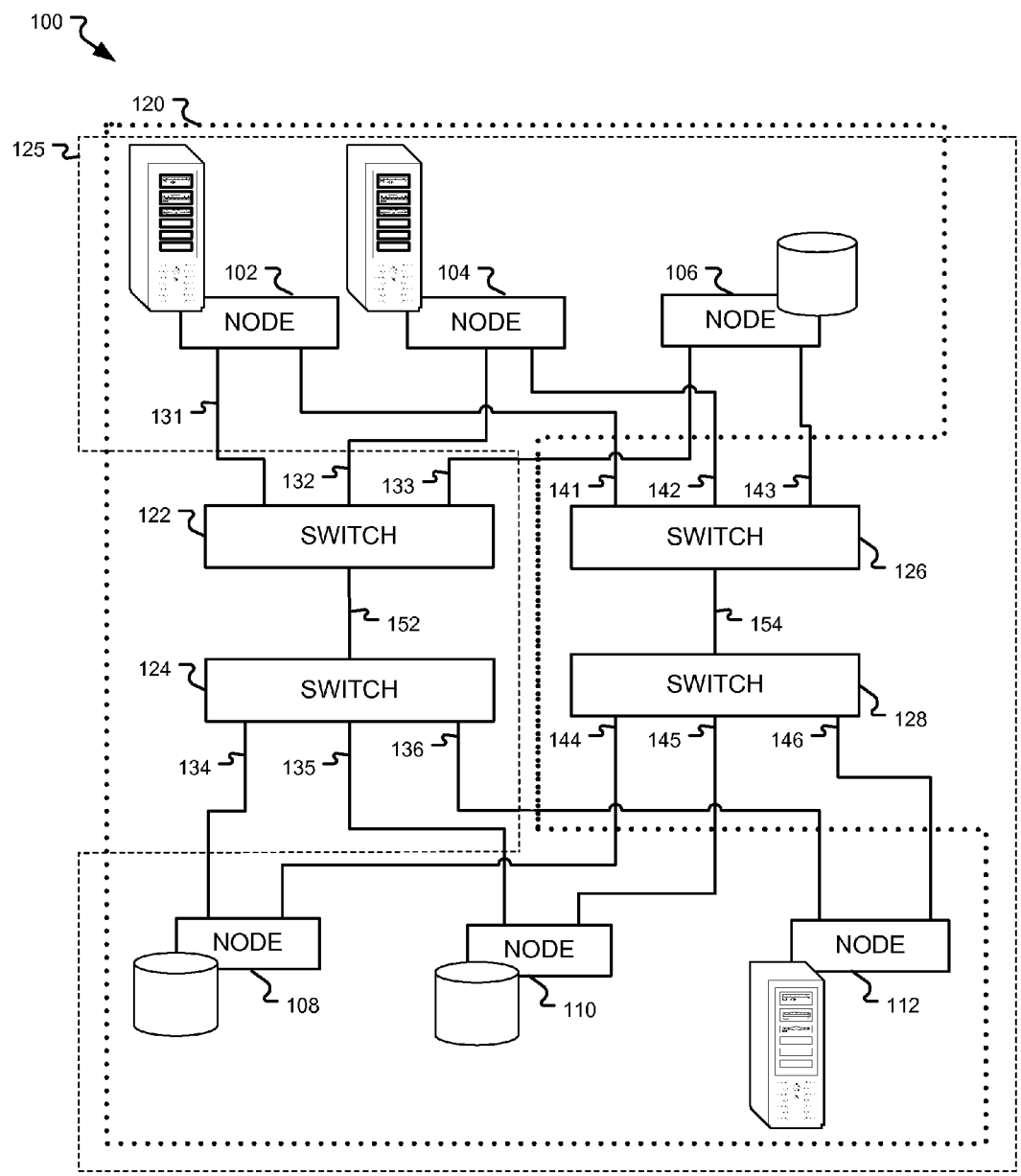
FIG. 1 illustrates an example configuration of a storage area network and two fabrics in which embodiments of the present invention may be implemented.

FIG. 1 depicts an example storage area network (SAN) in which aspects of the various embodiments of the present invention may be implemented. The SAN 100 depicted within FIG. 1 illustrates a network of interconnected computing devices, storage devices, and networking devices. Specifically, SAN 100 contains a plurality of nodes 102, 104, 106, 108, 110, 112. These nodes may be hosts that access storage capabilities of the SAN, or the nodes may be storage subsystems used to provide the data storage capabilities of the SAN. Other types of nodes such as tape libraries and storage virtualizers may exist on the SAN as well. As shown in FIG. 1, these nodes may include storage units 106, 108, and 110, in addition to computing systems 102, 104, and 112.

As illustrated in FIG. 1, the switched network existing between the plurality of nodes within the SAN 100 is configured with a first fabric 120. A fabric is inclusive of the nodes as well as the switched network connected to the nodes, with the SAN being the larger collection of one or more fabrics and the entire network configuration. Therefore, the fabric 120 includes all nodes connected within the SAN 100, in addition to a plurality of switches (122 and 124) within the SAN 100. As shown within fabric 120, switches 122 and 124 are connected to the various network nodes via connections 131, 132, 133, 134, 135, 136 to create a network having a line topology network with no redundancy in fabric connections (with switches 122 and 124 directly connected though an inter switch link 152).

FIG. 1 also provides an overlay illustration of the second fabric 125 containing switches 126 and 128. Thus, the second fabric 125 also covers the network nodes 102, 104, 106, 108, 110, 112, but via connections 141, 142, 143, 144, 145, 146 through switches 126 and 128 (with switches 126 and 128 directly connected through an inter switch link 154).

Although only two fabrics are shown within SAN 100 in FIG. 1, those skilled in the art would recognize that numerous fabrics may be configured within storage area networks of varying sizes. Likewise, the configuration of the SAN may differ such as by creating additional inter switch links between switches in the SAN to create a partially or fully connected mesh topology. For example, the connections within SAN 100 may be fibre channel connections, and the switches 122, 124, 126, 128 may be fibre channel switches. In alternative embodiments, the network type used within SAN 100 may be serial attached SCSI (SAS), iSCSI, Fibre Channel over Ethernet (FCoE), or other suitable storage area network data transfer technologies. Thus, the storage devices, switches, and subsystems connected to the fabrics within the SAN may be fibre channel storage devices, SAS storage devices, single storage devices, or other combinations of storage devices and enclosures operable within the appropriate network topology. The following disclosure will generally refer to fabrics employing a fibre channel topology due to its prevalent usage in storage area networks, although those skilled in the art will recognize that the present invention is equally applicable to other network protocols and technologies.

The successful operation of a SAN or any other distributed processing system is dependent on the elements of the network being in successful communication and functioning at all times. To verify the correct and continued operation of the SAN, agents may be deployed to probe the various elements of the fabric. For example, a probe of a fabric may be used to collect topology information that includes details such as a list of the switches in the fabric, the ports in the switches, and the ports to which these switch ports are connected to. Thus, the agents may use a probing operation to determine the configuration of the SAN and verify that all network connections are intact and operational. However, before the agents can be deployed on a fabric and proceed with a probe, an important task is to perform a fabric discovery, and identify which selection of available agents would most thoroughly and efficiently probe the fabric in future operations.

Existing techniques that employ agents fail to provide a comprehensive solution for the fabric discovery and identification of the most appropriate fabric-monitoring agents. For example, one limited approach for identifying agents is described in "Intelligent discovery of network information from multiple information gathering agents", U.S. patent application Ser. No. 10/666,046 to Nagarajrao et al., which is incorporated by reference herein in its entirety. As apparent from the following discussion, the presently disclosed invention provides significant improvements over this technique and others.

1. In techniques such as those disclosed in U.S. patent application Ser. No. 10/666,046, the candidate agents are generally located by finding the first agent capable of covering a specific entity. Although this approach identifies eligible agents, it does not necessarily provide the most efficient solution in scenarios where information needs to be retrieved from multiple entities, because it does not factor in agents capable of covering multiple entities. One key issue with this is that the minimal solution may not be determined, since each element's solution set is separate. As a simple example, even if agents A1 and A2 can both see entities E1 and E2, the solution set may result in use of A1 for E1 and A2 for E2, rather than just A1 or A2.

2. As recognized with techniques such as those disclosed in U.S. patent application Ser. No. 10/666,046, there is no granularity in the capabilities of the agents capable of reporting on an entity. Rather, all agents are categorized as either capable of reporting on an entity or not. This results in several issues: a) Two agents which each provide partial information for a entity cannot be grouped together as a complete solution for that entity, but instead must be ignored resulting in some information not being collected; b) If an agent fails part way through information retrieval and there is no other agent capable of providing the full data set for the entity, there is no way of determining if there is an agent that can be used to collect only the lost data. This limitation can lead to agents being asked to collect the full data set for the entity when only partial data needs to be collected and so the solution is less optimal; c) Similarly, in cases where only a subset of available information is needed, it is not possible to determine if an agent that is not able to report all information on the entity would be able to report the desired subset. This limitation can lead to either certain data to be not collected or lead to agents being asked to collect more data than needed; d) It will not be possible to determine the specific partial information that may not be collected based on the mix of agents; and e) The number of agents used may be more than required.

3. Existing techniques do not fully address many of the issues related to failures occurring in individual agents responsible for monitoring the fabric. If one or more agents that were selected to run failed and alternate agents are used to collect the information, then the transition should not result in false alerts being triggered. (For example, the status transition of a fabric marked as missing when Agent 1 fails and then marked as detectable when the fabric was visible to at least one agent throughout the period is caused only due to the fact that an alternate agent is used). Such false alerts should be averted. Additionally, if unable to communicate with one or more agents before they are invoked or if one or more agents fail subsequently it should be possible to determine alternate agents (if there are any that can be used) to collect the information.

In response to these problems, the presently disclosed invention provides for the identification and use of "equivalent subsets" of agents. By locating equivalent subsets, it is possible to run a set of "what if" scenarios to analyze the impact of an agent or agent type being added or removed, in terms of how the different set of agents increases or reduces the data being collected or in terms of the total number of agents that will be used. Moreover, using the presently disclosed embodiments, it is possible to determine what type of agent, or what specific agent/agents, needs to be added so that complete information can be collected for a fabric. It is also possible to do a pre-check and find out which subset of agents is likely to be successful in gathering the information (for example, using some kind of ping to the agents in subsets before trying to use them) so that failures may be dealt with before the fact rather than after they occur. It is also possible to try additional equivalent subsets if several subsets fail while gathering information to increase likelihood of collection of information for a fabric.

Alternate approaches and variations to the presently disclosed embodiments may also be used to speed up processing times, such as using more than one equivalent subset in parallel (so that in case one subset fails, information is collected by other subset and because processing is concurrent the elapsed time is reduced). It is also possible to compute the delta between equivalent subsets so that if the first subset fails, the minimal number of agents with an alternative equivalent subset may be used instead.

Fabric Discovery and Probing

Fabric discovery and probing is discussed in detail in the following examples and algorithms. The following techniques may be applicable or may otherwise be adapted to other network operations such as making zone changes to a fabric, or other types of problem domains.

Fabric Discovery is the process in which an agent discovers fabrics that it can report on. Information reported by a fabric discovery includes identifiers for the fabrics and the switches that are part of such fabrics. The capabilities of agent that discovered the fabrics also become known once fabric discovery is performed. The capabilities describe the kind of information about the fabric that an agent can collect on.

A Fabric Probe is the actual process in which an agent reports on detailed topology and zoning information for one or more fabrics. This may include the list of switches in a fabric, ports in each switch of the fabric, the ports to which those switch ports are connected to, zoning configurations for the fabric, and other details of the physical and logical entities in the fabric.

The overlapping capabilities may be identified in terms of switches in fabrics that agents can report on and/or category of information that an agent can report on for one or more switches in fabric. (For example, by identifying that agent A1 can report on switches S1 and S2 and agent A2 can report only on switch S1 in fabric; or that agent A1 can report on topology information for switches S1 and S2 and agent A2 can report on zoning information for switches S1 and S2).

Figure 2:
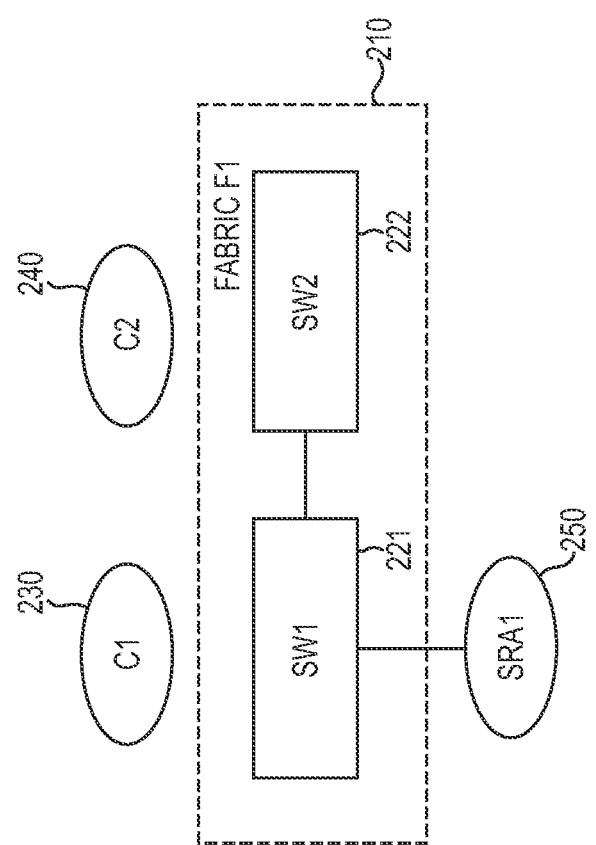
FIG. 2 illustrates an example fabric having a set of switches and a set of agents in which embodiments of the present invention may be implemented.

FIG. 2 illustrates an example configuration of a fabric F1 210 having switches SW1 221, SW2 222, and agents C1 230, C2 240, and SRA1 250. As determined in a fabric discovery of fabric F1 210, Agent C1 230 can report on F1→SW1, Agent C2 240 can report on F1→SW2, and Agent SRA1 250 can report on F1→SW1,SW2. C1, C2, and SRA1 can each report on zoning.

As fabric F1210 is probed for topology, the equivalent subsets for topology of the fabric are determined to be {{C1, C2}, {SRA1}}; and the equivalent subsets for zoning of the fabric are determined to be {{C1}, {C2}, {SRA1}}. In this example, if C1 is assigned to get topology and zoning info and C2 is assigned to get topology info, the fabric F1 may be successfully probed. Because information may be collected for all categories, there are no warning messages regarding information not collected within the fabric.

Figure 3:
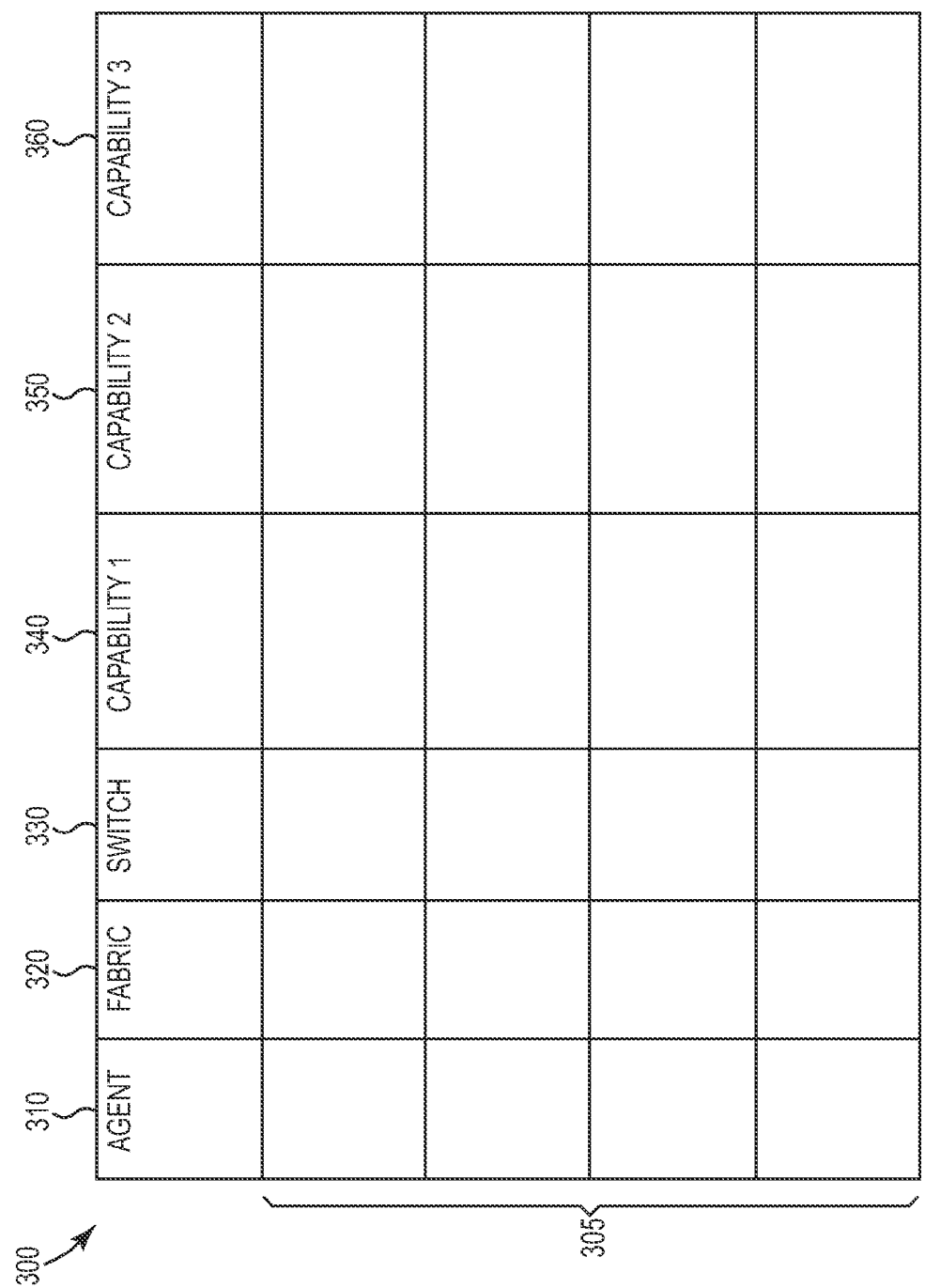
FIG. 3 illustrates a dynamic capability grid used for identifying characteristics of storage area network fabrics in accordance with one embodiment of the present invention.

In one embodiment, a capability grid is used to represent the capabilities of an agent. FIG. 3 presents an illustration of a dynamic capability grid 300 in connection with a SAN fabric. The number of rows in the grid 305 would correspond to the number of switches in the fabric, multiplied by the number of agents capable of reporting on fabric. Further, in addition to stored information for the agent 310, fabric 320, and switch 330, the grid may track a number of custom capabilities. For example, specific capabilities such as topology, full zone database, active zoning configuration, etc. may be tracked in columns 340, 350, 360.

Use of a dynamic capability grid may apply to data collection for a variety of other settings. For example, viewing an electrical energy grid as a networked configuration, the energy sources for an energy sink may be considered as agents with the operation being a determination of the potential energy sources for an energy sink.

Algorithm for Selection of Agents

The following algorithm that may be used for the selection of agents is generic and can take as input a capability grid that contains any kinds of capabilities relevant for the problem. The primary requirement, however, is that the dimensions of the capability grid for all agents be the same (i.e., same number of capabilities).

1) Initiate a fabric probe. This may be as a result of a user scheduling a fabric probe of one or more fabrics, or in response to a fabric event being received and the system deciding to perform an automatic fabric probe to detect any potential fabric changes due to the event.

2) Obtain a list of switches that are currently part of fabrics to be probed (this step is one variant and is not an indispensable step). 3) Perform fabric discoveries using all agents. 4) Build the list of fabrics to be probed by finding fabrics for which the switches (Using the list obtained prior to running discoveries) are part of (this step is also a variant and is not an indispensable step).

5) For each fabric to be probed: A.) Build a capability matrix for various agents reporting on the fabric and build a sorted equivalent subsets list. As used herein, an equivalent subset of agents is a subset of agents that have equivalent cumulative capabilities such that it is sufficient to use only one subset. For example, provided that {A1, A2}, {A3}, {A4} are equivalent subsets, either a) the combination of A1 and A2, b) A3, or c) A4 may be used in performing a fabric probe. B.) Perform a communication pre-check prior to including an agent in the equivalent subset so that if an agent is included in an equivalent subset, then inactive/non-functional agents are not included in the agent subset selected. C.) Assign a 'score' to each agent and to each agent subset that is added to the equivalent subset so that all the lists are always sorted and prioritized. Sorting is useful for indicating assignments. It is also helps in potentially choosing the same agent for probing a fabric if that same agent was chosen for probing another fabric already. D.) Determine the combined capabilities of each subset in the equivalent subsets list so that limitations (if any) are identified for the information that can be collected.

More specifically, the steps used for step 5) use the following techniques. For each agent type, a list of agents used for managing the fabric is returned. This list may be filtered and sorted using a number of rules, and for each agent in such a list a capability grid is returned. For each switch, using a capability grid for each agent that manages a fabric and tracking each category of information collected, build a list of agents that can collect information for that category for that switch; and create various combination of agents that can together collect information for all categories for that switch. Next, find all combination of equivalent sets by doing a cross-product of subsets that gather information for each switch in fabric. The equivalent subsets are then ranked.

One variant to step 5) involves applying a sorting criteria for the list of agents returned—such as agent type, or alphabetic order of the unique ID of the agent. (Each agent returned has a unique sequential number.) Scoring for equivalent subsets may be applied by most highly ranking sets covering most cells, followed by combination of agent type of subsets (subsets with only CIMOM agents, subsets with only CIMOM and SNMP agents, subsets with only CIMOM, SNMP and inband agents, subsets with Native APIs, subsets with Command Line Interfaces, and all agents). The sum of the sequential number of agents in a subset and may serve as a tiebreaker.

6) Using the identified equivalent subsets, indicate agent assignments for each of the fabrics being probed and run the fabric probes. One variant for this step includes creating a job that includes one equivalent agent subset for each fabric (if there is one). The equivalent agent subset that would be chosen is the 'first' one in the list. (Because the lists are sorted, choosing the first subset will result in the subset with the highest 'score' being chosen). After the newly created job completes, if there are any fabrics for which an equivalent subset was used and if the probe using that subset failed, then another new job is created to include all the remaining available equivalent subsets for each such fabric. After this second new job completes (if applicable), perform any logic that will result in an determination about which fabric entities are still visible to various agents and also any logic to handle visibility of fabric entities by agents that were not run due to agent assignment. This step is performed at the end so that transitions are handled appropriately when the equivalent subset picked fails and an alternate subset is used. Such handling of transitions will prevent any false alerts being generated. For example, if agent A1 that was initially selected by agent assignment to gather fabric information fails and alternate agent A2 was used subsequently which then gathered the fabric information throughout this window of processing, we want to consider fabric entities as detectable. If the processing that handles visibility of fabric entities by agents is not deferred until all alternate agents have been used for fabric probe, then it is possible that fabric entities will be marked as missing during the transition which can lead to undesired alerts that a fabric is not visible to the system only to be followed by an alert that the fabric entities are visible to system once the alternate agents gather the fabric information.

Examples

The following examples illustrate some of the various techniques for identifying agents described herein. Given a fabric and a set of agents capable of reporting on a fabric, the following diagrams illustrate the use of a dynamic compatibility grid and the computation of the equivalent subsets. The capabilities listed in the example (Topology, switch port info, etc) while used in SAN fabrics are for illustrative purposes only, and may be substituted with any number of like capabilities.

The actual algorithm to compute the equivalent subsets is generic and can handle any list of capabilities. Similarly switches in the fabric are considered components of a fabric on which agents can report information on. If there are other relevant components of a fabric for which agents can report on information on for one or more capabilities/categories then they can be added. The input to the algorithm is a set of agents each populating a two-dimensional grid with switches (or any other components of fabric for information is collected) on one axis and capabilities (categories of information that can be collected for that component).

Figure 4:
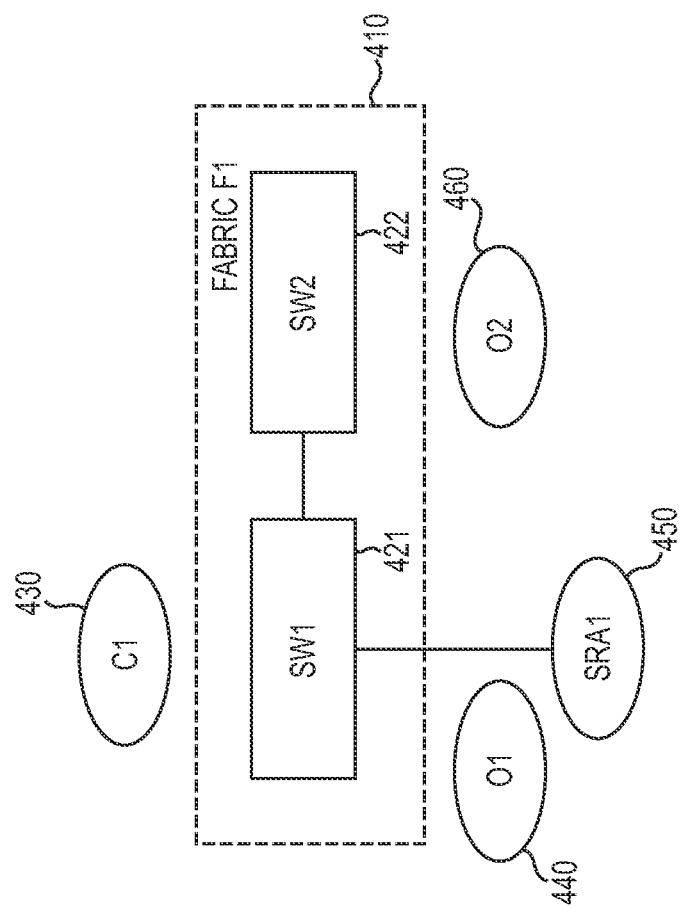
FIG. 4 illustrates another example fabric having a set of switches and a set of agents in which embodiments of the present invention may be implemented.

FIG. 4 provides an example of a first fabric configuration which may be probed using the various techniques provided by the present invention. A user probes fabric F1 410 for its topology. Agent C1 430 is assigned to obtain topology and zoning information for fabric F1 410. Agents O1 440 and O2 460 are also invoked. The probe for C1 430 ends successfully. The candidate subsets chosen successfully probed the fabric F1 410. Since Agent SRA 450 was not run, the internal tables will be updated accordingly.

In this configuration, it can be determined that Agent C1 430 can report on topology, blade and switch port information for performance management for all switches in fabric F1 410; Agent SRA1 can report on topology for all switches in fabric F1; Agent C1 430 can report on zoning; and Agents O1 440 and O2 460 can report on topology information for SW1 421 and SW2 422 respectively. Therefore, the equivalent subsets for topology are {C1}, {C1,O1}, {C1,O2}, {C1,O1, O2}, {C1,SRA1}, {C1,O1,SRA1}, {C1,O2,SRA1} for fabric F1 410. The equivalent subsets for zoning are {{C1}} for fabric F1 410.

FIG. 5 provides an example of the dynamic compatibility grid 500 based on information collected using the fabric probe performed in FIG. 4. As shown, rows 501 detail the information collected for agents connected to switch SW1, and rows 502 detail the information collected for agents connected to switch SW2. The network-specific information tracked within the grid 500 includes an identifier of the agent 510, the fabric 520, the switch 530, the topology 540, the blade information 550, the switch port information for performance management (PM) 560, and an indicator whether a certain physical infrastructure 570 such as a CISCO physical infrastructure exists.

Within the grid 500, information stored for switch SW1 includes: Topology—C1, O1, SRA1; Blade—C1; PM—C1; Physical Infrastructure—; and therefore the subsets that can cover SW1 are {C1}, {C1,O1}, {C1,SRA1}. Information stored for switch SW2 includes: Topology—C1, O2, SRA1; Blade—C1; PM—C1; Physical Infrastructure—; and the subsets that can cover SW1 are {C1}, {C1,O2}, {C1,SRA1}. Again, equivalent subsets are combinations of the subsets that cover all categories of information for all the switches in the fabric. Using a sequential number for agents—C1 has 1, O1 has 2, O2 has 3, SRA1 has 4. Thus, the order is {C1}, {C1, O1}, {C1,O2}, {C1,O1, O2}, {C1,SRA1}, {C1,O1, SRA1}, {C1,O2, SRA1}. For zoning, equivalent subsets are {{C1}}

In a second example of the fabric configuration illustrated in FIG. 4, C1 may be assigned to obtain topology and zoning info for fabric F1. O1 and O2 may also be invoked. Suppose that the probe for C1 fails. SRA1 is also invoked. This results in a warning message that data was not collected for PM and blade info. User probes F1 for topology. Agent C1 can report on topology, blade and switch port information for performance management for all switches in fabrics F1, Agent SRA1 can report on topology for all switches in fabric F1. Agent C1 can report on zoning. Agents O1 and O2 can report on topology for switches SW1 and SW2 respectively. Equivalent Subsets for topology are {O1,O2}, {SRA1}, {O1, SRA1}, {O2, SRA1} for F1 after C1 failed. Equivalent Subsets for zoning are { } for F1 after C1 is known to have failed.

Within the dynamic capability grid, the following values may be recorded: For switch SW1: Topology—O1, SRA1; Blade—(blank); PM—(blank); Physical Infrastructure—(blank). Subsets that can cover SW1 are {O1}, {SRA1}. For switch SW2: Topology—O2, SRA1; Blade—(blank); PM—(blank); Physical Infrastructure—(blank). Subsets that can cover SW2 are {O2}, {SRA1}. Sequential number for agents—C1 has 1, O1 has 2, O2 has 3, SRA1 has 4 {O1,O2}, {SRA1}, {O1, SRA1}, {O2, SRA1}. For zoning, a list of equivalent subsets is blank { }.

Figure 6:
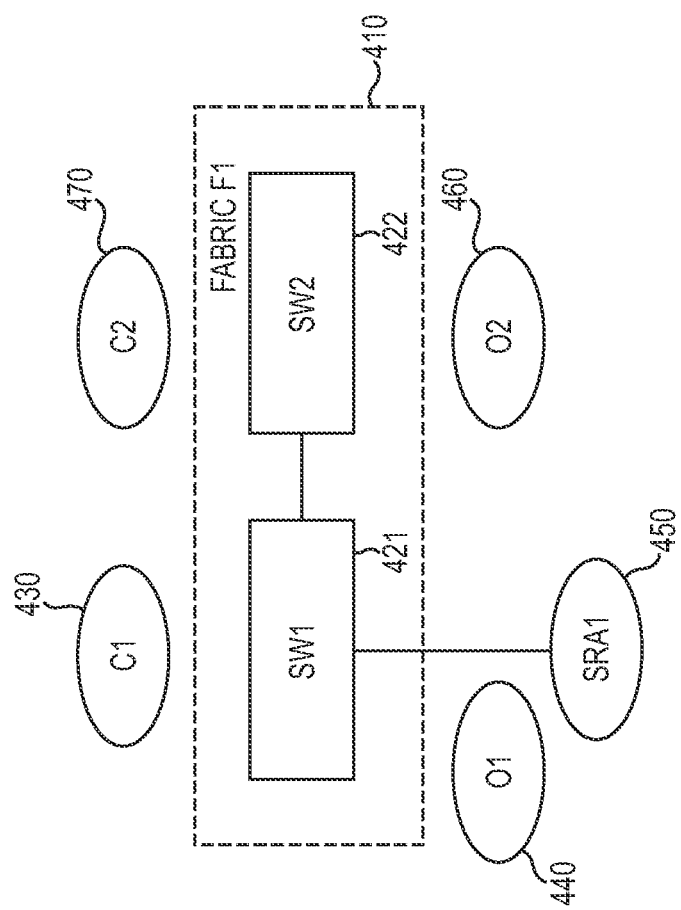
FIG. 6 illustrates another example fabric having a set of switches and a set of agents in which embodiments of the present invention may be implemented.

FIG. 6 provides another configuration of fabric F1 410, with switches SW1 421 and SW2 422, and agents C1 430, C2 470, O1 440, SRA1 450, and O2 460. In a first example using the configuration depicted in FIG. 6, agents O1 440 and O2 460 are assigned to obtain topology and physical infrastructure info and C1 and C2 are assigned to obtain switch-port information and SRA1 to get zoning for fabric F1. Each of the probes for O1,O2,C1,C2 and SRA1 succeed. User probes F1 for topology. Agents C1 and C2 can report on switch port information for performance management for switches SW1 and SW2 respectively. Agent SRA1 can report on topology and zoning for all switches in fabric F1. Agents O1 and O2 can report on topology and physical infrastructure for SW1 and SW2 respectively.

Within the dynamic capability grid, for switch SW1: Topology—O1, SRA1; Blade—(blank); PM—C1; Physical Infrastructure—O1. Subsets that can cover SW1 are {O1, C1}, {O1,C1,SRA1}. For switch SW2: Topology—O2, SRA1; Blade—(blank); PM—C2; Physical Infrastructure—O2. Subsets that can cover SW1 are {O2,C2},{O2,C2, SRA1}. Equivalent subsets are a cross-product of the subsets that cover each switch. Sequential number for agents—C1 has 1, C2 has 2, O1 has 3, O2 has 4, SRA1 has 5, resulting in {O1,O2,C1,C2},{O1,O2,C1,C2,SRA1} for fabric F1. For zoning, the equivalent subsets are {{SRA1}} for fabric F1.

In a second example using the configuration depicted in FIG. 6, O1 and O2 are assigned to obtain topology, SRA1 is assigned to obtain zoning information, and C1 and C2 are assigned to obtain switch-port information for performance management for fabric F1. Probes for O1,O2,SRA1,C1,C2 succeed. The user probes F1 for topology. In this configuration, agents C1 and C2 can report on switch port information for switches SW1 and SW2 respectively. Agent SRA1 can report on topology and zoning for F1. Agents O1 and O2 can report on topology for SW1 and SW2 respectively.

Within the dynamic capability grid for switch SW1, Topology—O1, SRA1; Blade—(blank); PM—C1; Physical Infrastructure—(blank). Subsets that can cover SW1 are {O1,C1}, {C1,SRA1}. For switch SW2: Topology—O2, SRA1; Blade—(blank); PM—C2; Physical Infrastructure—(blank). Subsets that can cover SW1 are {O2,C2},{C2,SRA1}. Equivalent subsets are a cross-product of the subsets that cover each switch. Sequential number for agents—C1 has 1, C2 has 2, O1 has 3, O2 has 4, SRA1 has 5, resulting in an order of {{O1,O2,C1,C2}, {C1,C2,SRA1}, {O1,C1,C2,SRA1}, {O2,C1,C2,SRA1}} for topology for fabric F1. For zoning, the equivalent subsets for fabric F1 are {{SRA1}}.

As will be appreciated by one skilled in the art, variations to the presently disclosed steps may be added or omitted to process fabrics and the use of agents within a storage area network. Further, many portions of the techniques described herein are applicable to other types of network topologies such as non-fibre channel networks. Moreover, the network topologies depicted and the characteristics of the networks described may vary significantly.

As will also be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method of selecting agents for gathering information from a set of fabrics in a storage area network, comprising:
    performing fabric discovery operations on the set of fabrics using each agent connected to the storage area network, the fabric discovery operations producing capability information of each agent within the set of fabrics;
    generating groups of equivalent subsets of agents capable of collecting information for the set of fabrics, the equivalent subsets of agents grouped based on agent capabilities relative to each fabric in the storage area network, including for each fabric:
        populating a capability matrix with data for each agent reporting on the fabric, the capability matrix providing an indication of a set of capabilities of each agent for the fabric;
        identifying subsets of agents having overlapping capabilities for the fabric as indicated in the capability matrix;
        performing a communication check on each agent in each subset of identified agents; and
        adding each subset of identified agents to a group within the groups of equivalent subsets responsive to successful performance of the communication check for the subset of identified agents;
    selecting, for the set of fabrics, equivalent subsets of agents from the groups of equivalent subsets of agents; and
    executing fabric probes on the set of fabrics using the selected equivalent subsets.

2. The method of claim 1, wherein selecting equivalent subsets and executing the fabric probes on the set of fabrics further comprises:
    creating a first job to attempt a fabric probe using one equivalent agent subset for each fabric, the one equivalent agent subset selected from a ranked list of equivalent agent subsets;
    waiting for the first job to complete;
    creating a second job to attempt a fabric probe using other equivalent subsets selected from the ranked list of equivalent agent subsets responsive to the first job failing to successfully execute;
    waiting for the second job to complete; and
    updating the ranked list of equivalent agent subsets if one or more agents failed to successfully execute in the first job or the second job.

3. The method of claim 1, wherein adding each subset of identified agents to the groups of equivalent subsets includes ranking equivalent subsets within each group of equivalent subsets.

4. The method of claim 1, wherein equivalent subsets within each group of equivalent subsets are sorted based on agent type or agent unique identifier.

5. The method of claim 1, wherein equivalent subsets within each group of equivalent subsets are ranked in the order of: sets covering most cells; subsets with only CIMOM agents; subsets with only CIMOM and SNMP agents; subsets with only CIMOM, SNMP, and inband agents; subsets with Native APIs; subsets with Command Line Interfaces; and all agents.

6. The method of claim 1, wherein performing fabric discovery operations further comprises obtaining a list of switches currently part of fabrics to be probed.

7. The method of claim 1, further comprising determining combined capabilities of identified agent subsets within each equivalent subset, thereby determining limitations for information that can be collected from the fabric.

8. The method of claim 1, wherein the method of selecting agents is performed in response to scheduling of a fabric probe for one or more fabrics.

9. The method of claim 1, wherein the method of selecting agents is performed in response to receipt of a fabric event and initiation of an automatic fabric probe to detect potential fabric changes due to the fabric event.

10. A method of selecting equivalent sets of agents with defined capabilities using a dynamic capability grid, comprising:
    performing discovery operations using each agent within a defined environment to determine agent capability information;
    generating groups of equivalent subsets of agents based on the agent capability information collected from the discovery operations, the equivalent subsets of agents grouped by each agent capability discovered in the defined environment, including:
        populating a capability matrix with data for each agent operating within the defined environment, the capability matrix providing an indication of a set of capabilities for each agent relative to items within the defined environment;
        identifying sets of agents having overlapping capabilities within the defined environment as indicated in the capability matrix;
        scoring and ranking the set of identified agents; and
        adding each set of identified agents to a group within the groups of equivalent subsets;
    selecting equivalent subsets from the groups of equivalent subsets to perform actions within the defined environment based on capabilities associated with the equivalent subsets; and
    executing operations within the defined environment using the selected equivalent subsets.

11. A storage management system, comprising:
    a storage area network configured to provide a set of fabrics;
    at least one processor within the storage management system;
    at least one memory store within the storage management system having instructions operable with the at least one processor for selecting agents for gathering information from the set of fabrics in the storage area network, the instructions being executed on hardware components within the storage management system for:

performing fabric discovery operations on the set of fabrics using each agent connected to the storage area network, the fabric discovery operations producing capability information of each agent within the set of fabrics;

generating groups of equivalent subsets of agents capable of collecting information for the set of fabrics, the equivalent subsets of agents grouped based on agent capabilities relative to each fabric in the storage area network, including for each fabric:

populating a capability matrix with data for each agent reporting on the fabric, the capability matrix providing an indication of a set of capabilities of each agent for the fabric;

identifying subsets of agents having overlapping capabilities for the fabric as indicated in the capability matrix;

performing a communication check on each agent in each subset of identified agents; and adding each subset of identified agents to a group within the groups of equivalent subsets responsive to successful performance of the communication check for the subset of identified agents;

selecting, for the set of fabrics, equivalent subsets of agents from the groups of equivalent subsets of agents; and executing fabric probes on the set of fabrics using the selected equivalent subsets.

12. The storage management system of claim 11, wherein selecting equivalent subsets and executing the fabric probes on the set of fabrics further comprises:

creating a first job to attempt a fabric probe using one equivalent agent subset for each fabric, the one equivalent agent subset selected from a ranked list of equivalent agent subsets;

waiting for the first job to complete;

creating a second job to attempt a fabric probe using other equivalent subsets selected from the ranked list of equivalent agent subsets responsive to the first job failing to successfully execute;

waiting for the second job to complete; and updating the ranked list of equivalent agent subsets if one or more agents failed to successfully execute in the first job or the second job.

13. The storage management system of claim 11, wherein adding each subset of identified agents to the groups of equivalent subsets includes ranking equivalent subsets within each group of equivalent subsets.

14. The storage management system of claim 11, wherein equivalent subsets within each group of equivalent subsets are sorted based on agent type or agent unique identifier.

15. The storage management system of claim 11, wherein equivalent subsets within each group of equivalent subsets are ranked in the order of: sets covering most cells; subsets with only CIMOM agents, subsets with only CIMOM and SNMP agents; subsets with only CIMOM, SNMP, and inband agents; subsets with Native APIs; subsets with Command Line Interfaces; and all agents.

16. The storage management system of claim 11, wherein performing fabric discovery operations further comprises obtaining a list of switches currently part of fabrics to be probed.

17. The storage management system of claim 11, further comprising instructions for determining combined capabilities of identified agent subsets within each equivalent subset, thereby determining limitations for information that can be collected from the fabric.

18. The storage management system of claim 11, wherein the method of selecting agents is performed in response to scheduling of a fabric probe for one or more fabrics.

19. The storage management system of claim 11, wherein the method of selecting agents is performed in response to receipt of a fabric event and initiation of an automatic fabric probe to detect potential fabric changes due to the fabric event.

20. A system, comprising:

at least one processor within the system;

at least one memory store within the system having instructions operable with the at least one processor for selecting equivalent sets of agents with defined capabilities using a dynamic capability grid, the instructions being executed on hardware components within the system for:

performing discovery operations using each agent within a defined environment to determine agent capability information;

generating groups of equivalent subsets of agents based on the agent capability information collected from the discovery operations, the equivalent subsets of agents grouped by each agent capability discovered in the defined environment, including:

populating a capability matrix with data for each agent operating within the defined environment, the capability matrix providing an indication of a set of capabilities for each agent relative to items within the defined environment;

identifying sets of agents having overlapping capabilities within the defined environment as indicated in the capability matrix;

scoring and ranking the set of identified agents; and adding each set of identified agents to a group within the groups of equivalent subsets;

selecting equivalent subsets from the groups of equivalent subsets to perform actions within the defined environment based on capabilities associated with the equivalent subsets; and executing operations within the defined environment using the selected equivalent subsets.

\* \* \* \* \*